United States Patent
Chen et al.

(10) Patent No.: US 12,069,684 B2
(45) Date of Patent: Aug. 20, 2024

(54) DOWNLINK CONTROL SIGNALING IN WIRELESS COMMUNICATION

(71) Applicant: ZTE Corporation, Guangdong (CN)

(72) Inventors: Mengzhu Chen, Guangdong (CN); Jun Xu, Guangdong (CN); Saijin Xie, Guangdong (CN); Hao Wu, Guangdong (CN)

(73) Assignee: ZTE Corporation, Shenzhen (CN)

( * ) Notice: Subject to any disclaimer, the term of this patent is extended or adjusted under 35 U.S.C. 154(b) by 377 days.

(21) Appl. No.: 17/492,265

(22) Filed: Oct. 1, 2021

(65) Prior Publication Data

US 2022/0022176 A1    Jan. 20, 2022

Related U.S. Application Data

(63) Continuation of application No. PCT/CN2019/081086, filed on Apr. 2, 2019.

(51) Int. Cl.
*H04W 72/23*    (2023.01)

(52) U.S. Cl.
CPC .................................. *H04W 72/23* (2023.01)

(58) Field of Classification Search
None
See application file for complete search history.

(56) References Cited

U.S. PATENT DOCUMENTS

| 2021/0022210 A1* | 1/2021 | Hoshino | H04L 5/0016 |
| 2021/0344527 A1* | 11/2021 | Go | H04W 72/1268 |

FOREIGN PATENT DOCUMENTS

| CN | 102118189 A | 7/2011 |
| CN | 104113925 A | 10/2014 |
| CN | 105848165 A | 8/2016 |
| CN | 108282247 A | 7/2018 |
| WO | 2012/152993 A1 | 11/2012 |

OTHER PUBLICATIONS

International Search Report and Written Opinion mailed on Dec. 27, 2019 for International Application No. PCT/CN2019/081086, filed on Apr. 2, 2019 (6 pages).
European Search Report for EP Patent Application No. 19923011.1, dated Mar. 30, 2022, 9 pages.
NTT Docomo, Inc., "Views on UL HARQ-ACK feedback design for MTC," 3GPP TSG RAN WG1 Meeting #93, R1-1807044, Busan, Korea, May 21-25, 2018, 3 pages.
LG Electronics, "Specification aspects on low-cost MTC," 3GPP TSG RAN WG1 #66bis, R1-113284, Zhuhai, China, Oct. 10-14, 2011, 4 pages.
Qualcomm Incorporated, "DL control channels overview," 3GPP TSG-RAN WG1 #86bis, R1-1610177, Lisbon, Portugal, Oct. 10-14, 2016, 6 pages.
European Communication pursuant to Article 94(3) EPC issued in EP Patent Application No. 19923011.1, dated Jan. 3, 2024, 5 pages.

* cited by examiner

*Primary Examiner* — Anh Ngoc M Nguyen
(74) *Attorney, Agent, or Firm* — Perkins Coie LLP

(57) ABSTRACT

Methods, systems, and devices for a downlink control signaling in wireless communication are described. A wireless communication method is provided to comprise transmitting, by a network device, to a user device, a control signaling including N data blocks that indicate T triggering states of M user devices, and wherein N, T, and M are natural numbers and the triggering states indicate configuration information of the M user devices.

20 Claims, 8 Drawing Sheets transmitting, by a network device, to a user device, a control signaling including N data blocks that indicate T triggering states of M user devices, wherein N, T, and M are natural numbers and the triggering states indicate configuration information of the M user devices

FIG. 5 receiving, by a user device, from a network device, a control signaling including N data blocks that indicate T triggering states of M user devices, wherein N, T, and M are natural numbers and the triggering states indicate configuration information of the M user devices

FIG. 6

DOWNLINK CONTROL SIGNALING IN WIRELESS COMMUNICATION

CROSS-REFERENCE TO RELATED APPLICATIONS

This application is a continuation of International Patent Application No. PCT/CN2019/081086, filed on Apr. 2, 2019, the contents of which are incorporated herein by reference in their entirety.

TECHNICAL FIELD

This patent document generally relates to systems, devices, and techniques for wireless communications.

BACKGROUND

Wireless communication technologies are moving the world toward an increasingly connected and networked society. With the development of wireless communication technologies, performance factors such as transmission rate, delay, throughput, and reliability of wireless communication systems have been greatly improved through technologies such as high frequency carrier, large frequency bandwidth, and multiple antenna configurations.

SUMMARY

This document relates to methods, systems, and devices for downlink control signaling in wireless communication. The disclosed technology describes methods that can be implemented at a plurality of mobile devices (or terminals, or user equipment) or a plurality of networks (such as a base station, gNodeB) to provide more efficient power saving schemes and better performance.

In one aspect, a wireless communication method is provided to comprise transmitting, by a network device, to a user device, a control signaling including N data blocks that indicate T triggering states of M user devices, and wherein N, T, and M are natural numbers and the triggering states indicate configuration information of the M user devices.

In another aspect, a wireless communication method is provided to comprise: receiving, by a user device, from a network device, a control signaling including N data blocks that indicate T triggering states of M user devices, and wherein N, T, and M are natural numbers and the triggering states indicate configuration information of the M user devices.

In another aspect, a wireless communication apparatus comprising a processor configured to perform the disclosed methods is disclosed.

In another aspect, a computer readable medium having code stored thereon is disclosed. The code, when implemented by a processor, causes the processor to implement a method described in the present document.

The above and other aspects and their implementations are described in greater detail in the drawings, the descriptions, and the claims.

BRIEF DESCRIPTION OF THE DRAWINGS

FIG. 5 shows an example of a wireless communication based on some implementations of the disclosed technology.

FIG. 6 shows another example of a wireless communication based on some implementations of the disclosed technology.

DETAILED DESCRIPTION

The disclosed technology provides implementations and examples of a downlink control signaling in wireless communication. Some implementations of the disclosed technology suggest efficient power saving techniques to instruct a user device to perform its operation based on information included in a DCI (Downlink Control Information). In some implementations, the DCI includes information to control one or more user devices to help the user devices to save power consumption and improve the performance.

Figure 1:
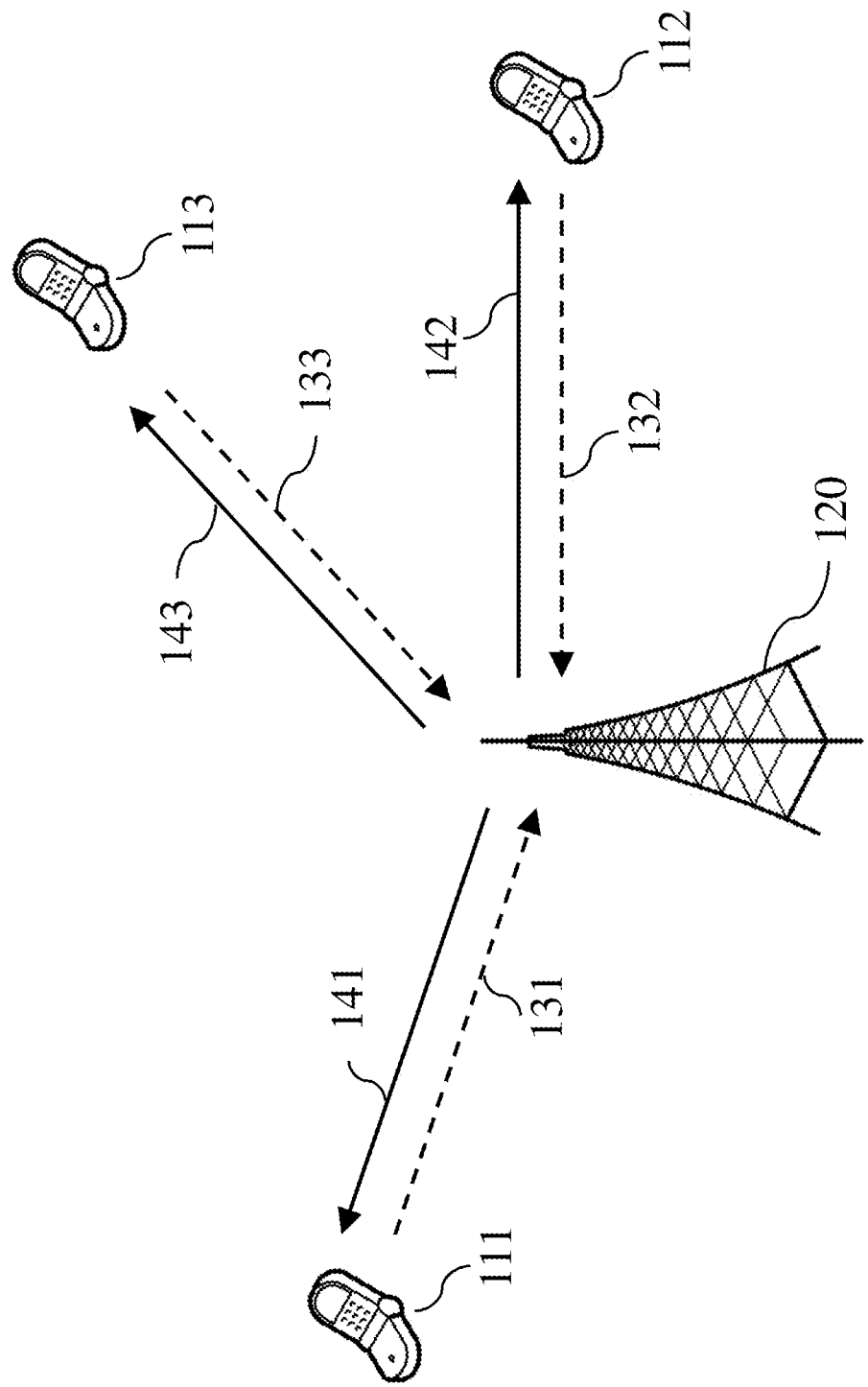
FIG. 1 shows an example of a base station (BS) and user equipment (UE) in wireless communication based on some implementations of the disclosed technology.

FIG. 1 shows an example of a wireless communication system (e.g., a 5G or NR cellular network) that includes a BS 120 and one or more user equipment (UE) 111, 112 and 113. In some embodiments, the UEs access the BS (e.g., the network) using implementations of the disclosed technology (131, 132, 133), which then enables subsequent communication (141, 142, 143) from the BS to the UEs. The UE may be, for example, a smartphone, a tablet, a mobile computer, a machine to machine (M2M) device, an Internet of Things (IoT) device, and so on.

Figure 2:
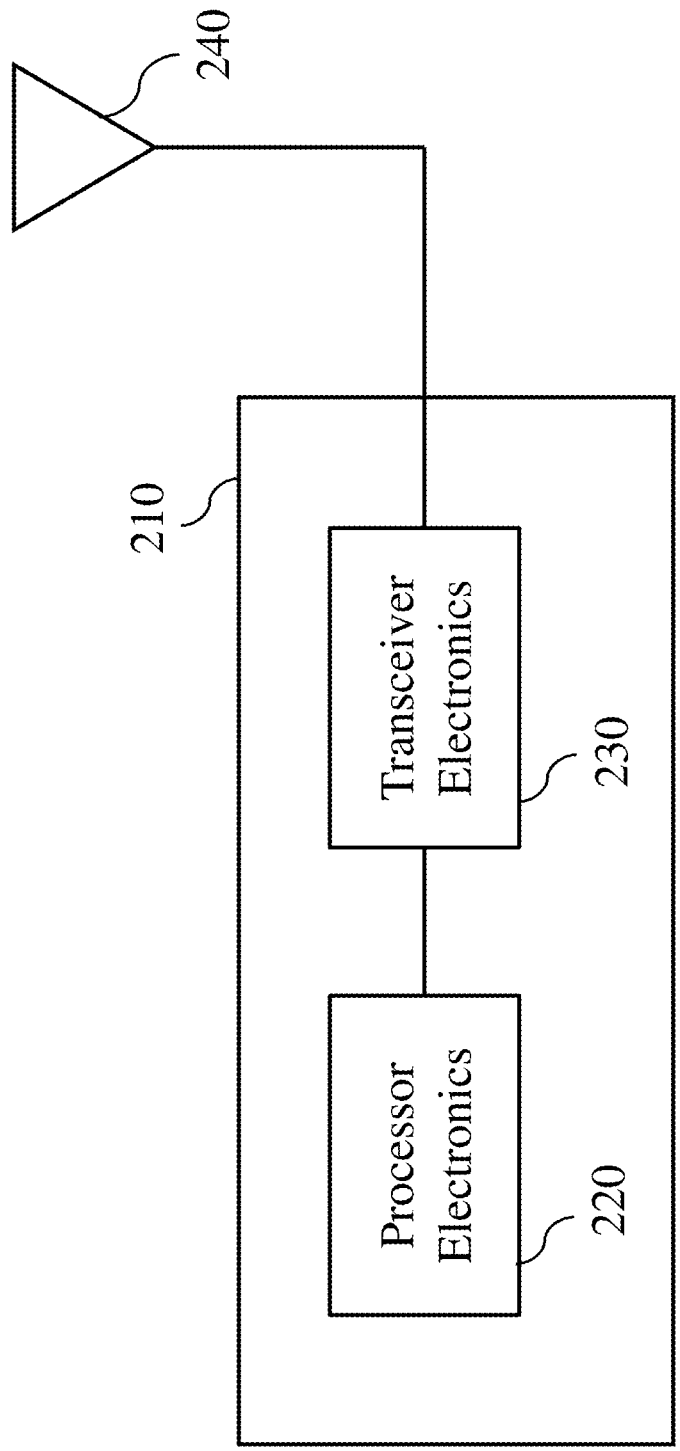
FIG. 2 shows an example of a block diagram of a portion of an apparatus based on some implementations of the disclosed technology.

FIG. 2 shows an example of a block diagram representation of a portion of an apparatus. An apparatus 210 such as a base station or a wireless device (or UE) can include processor electronics 220 such as a microprocessor that implements one or more of the techniques presented in this document. The apparatus 210 can include transceiver electronics 230 to send and/or receive wireless signals over one or more communication interfaces such as antenna 240. The apparatus 210 can include other communication interfaces for transmitting and receiving data. The apparatus 210 can include one or more memories (not explicitly shown) configured to store information such as data and/or instructions. In some implementations, the processor electronics 220 can include at least a portion of transceiver electronics 230. In some embodiments, at least some of the disclosed techniques, modules or functions are implemented using the apparatus 210.

The power consumption of a user device is an important factor which affects the user experiences. Various implementations of the disclosed technology provide power saving techniques of a user device in the wireless communication system. In some implementations of the disclosed technology, to improve the network performance, the power saving techniques suggest that some information of one or more UEs (user equipment) is coded together to reduce a size of the DCI payload.

Figure 3:
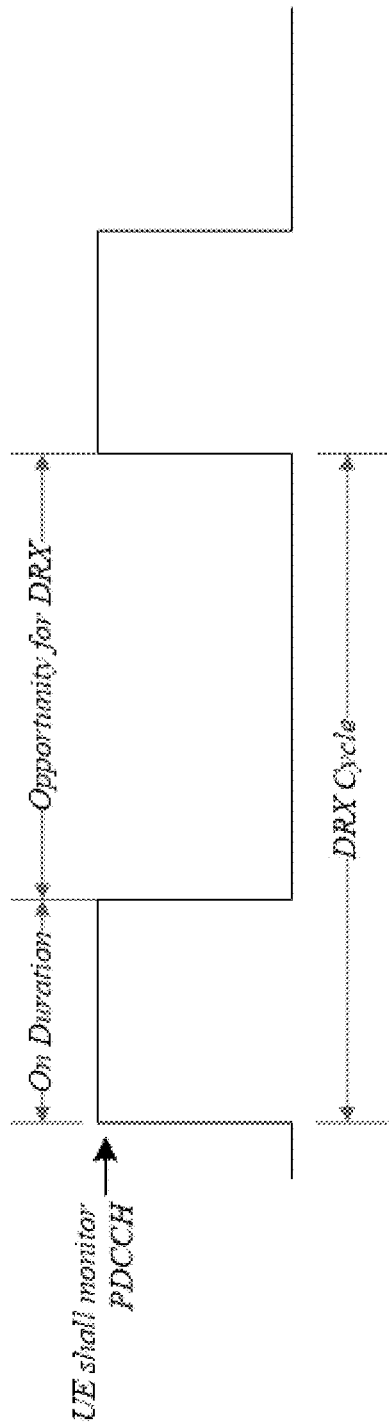
FIG. 3 shows an example of a DRX (Discontinuous Reception) cycle with some parameters.

When DRX (Discontinuous Reception) is configured, the UE does not have to continuously monitor PDCCH (Physical Downlink Control Channel). FIG. 3 shows an example of a DRX cycle with some parameters. DRX is characterized by the following:

on-duration: duration that the UE waits for, after waking up, to receive PDCCHs. If the UE successfully decodes a PDCCH, the UE stays awake and starts the inactivity timer;

inactivity-timer: duration that the UE waits to successfully decode a PDCCH, from the last successful decoding of a PDCCH, failing which it can go back to sleep. The UE shall restart the inactivity timer following a single successful decoding of a PDCCH for a first transmission only (i.e. not for retransmissions);

retransmission-timer: duration until a retransmission can be expected;

cycle: specifies the periodic repetition of the on-duration followed by a possible period of inactivity;

active-time: total duration that the UE monitors PDCCH. This includes the "on-duration" of the DRX cycle, the time UE is performing continuous reception while the inactivity timer has not expired, and the time when the UE is performing continuous reception while waiting for a retransmission opportunity.

Even with DRX configuration, the UE needs to wake up to monitor PDCCH periodically, which may result into unnecessary power consumption when there is no data transmission or reception during the On Duration.

Figure 4:
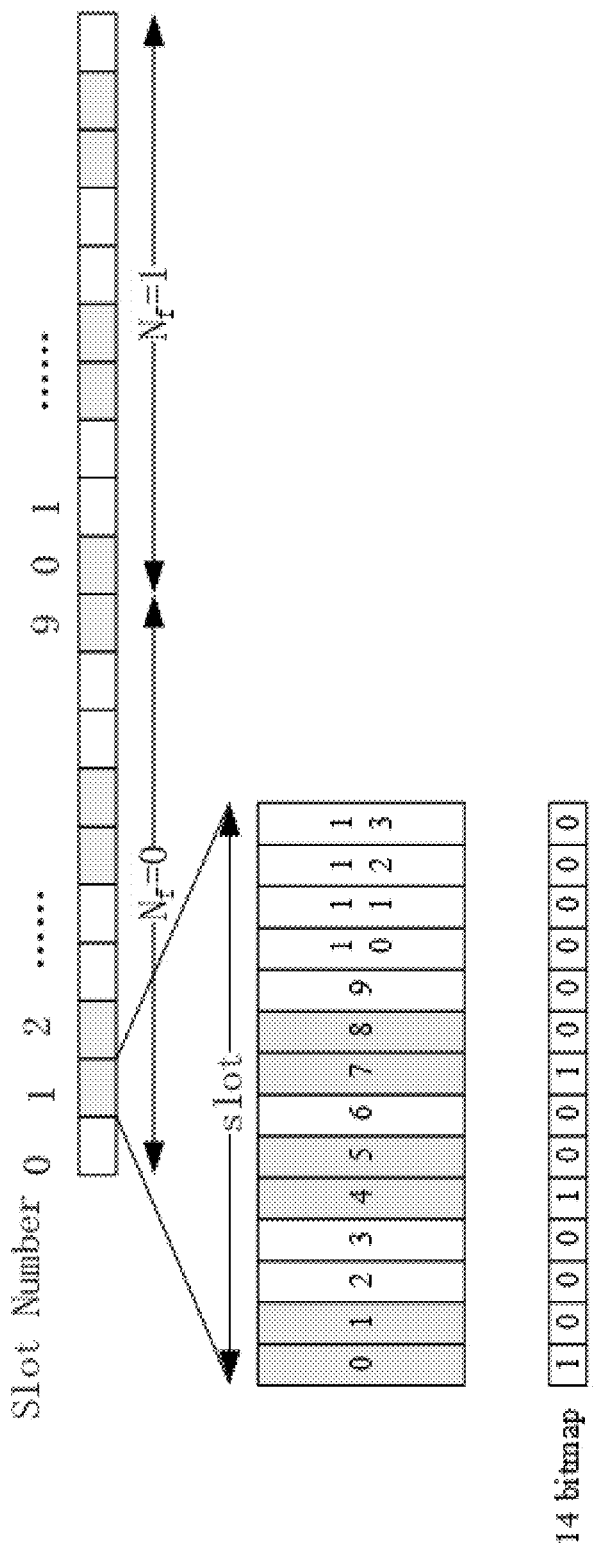
FIG. 4 shows an example of a schematic view illustrating a PDCCH (Physical Downlink Control Channel) monitoring.

For the PDCCH monitoring, the periodicity of its search space could be configured by RRC (Radio Resource Control) signaling. Multiple, e.g. 10 at most, search spaces could be configured per downlink BWP (Bandwidth Part). The PDDCH monitoring occasion within the search space is related to the periodicity, offset, and duration, the PDCCH monitoring pattern within a slot and so on. FIG. 4 shows an example of a schematic view illustrating a PDCCH monitoring. In FIG. 4, the periodicity is 4 slots, the offset is 1 slot, duration is 2 slots. The PDCCH monitoring pattern within a slot is in a 14 bitmap. In the example, the PDCCH monitoring occasion is configured by a higher layer signaling.

For the BWP adaptation, the UE can be configured with multiple BWPs. The dynamic BWP switching can be realized by a DCI indication and/or a timer.

For CA-DC (Carrier Aggregation-Duel Connection) operation, the Scell (Secondary Cell) can be deactivated by a timer or MAC CE (Control Element).

For the current scheme in spatial domain, the MIMO configurations (e.g., number of configuration antenna ports) are up to UE capability, channel condition, higher layer parameters and so on. The spatial configuration does not dynamically adapt to traffic arriving.

In time domain, the time domain resource allocation parameters include K0, K1, K2 and A-CSI (Aperiodic CSI) offset. A list of some examples of time domain resource allocation parameters, such as K0, K1 and K2, is configured by a RRC signaling and the actual parameter used in the scheduling is indicated by DCI (Downlink Control Information). The A-CSI (Aperiodic CSI) offset is related to the QCL (Quasi co-location) type. In the current scheme, the UE has no knowledge of the time domain resource allocation before the PDCCH is decoded or the time domain resource allocation is related to the QCL type, which potentially increases UE power consumption.

K0: Slot offset between DCI and its scheduled PDSCH (Physical Downlink Shared Channel)

K1: Timing for given PDSCH to the DL(downlink) ACK (acknowledgement);

K2: Slot offset between DCI and its scheduled PUSCH (Physical Uplink Shared Channel)

The A-CSI offset, aperiodicTriggeringOffset, is the offset between the slot containing the DCI that triggers a set of aperiodic NZP (Non-Zero Power) CSI-RS resources and the slot in which the CSI-RS resource set is transmitted.

To further reduce UE power consumption, some implementations of the disclosed technology provide a more power-efficient method which introduces a power saving signal to indicate UE to wake up when it is necessary. In some implementations, the power saving signal can be configured with other functionalities, such as PDCCH monitoring information, BWP switching, Scell operation, spatial domain information, time domain information, SRS request, CSI Request, QCL information and so on to further reduce the power consumption or improve the network performance.

Some implementations of the disclosed technology provide a wireless communication method as shown in FIGS. 5 and 6. In FIG. 5, the method includes transmitting, by a network device, to a user device, a control signaling including N data blocks that indicate T triggering states of M user devices, and wherein N, T, and M are natural numbers and the triggering states indicate configuration information of the M user devices. In some implementations, the control signaling includes a control information format indicator. In some implementations, the control signaling includes a functionality indicator. In some implementations, N equals to 1.

In FIG. 6, the method includes, receiving, by a user device, from a network device, a control signaling including N data blocks that indicate T triggering states of M user devices, and wherein N, T, and M are natural numbers and the triggering states indicate configuration information of the M user devices. In some implementations, the control signaling includes a control information format indicator. In some implementations, the control signaling includes a functionality indicator. In some implementations, N equals to 1.

Embodiment 1

In some implementation, each of the M user devices is configured with one data block.

In some example, the field of the data block is defined in the Table 1. For the UE configured with the data block, the triggering state-0 is indicated by the value or codepoint of "00" of the data block, the triggering state-1 is indicated by the value or codepoint of "01" of the data block, the triggering state-2 is indicated by the value or codepoint of "10" of the data block, the triggering state-3 is indicated by the value or codepoint of "11" of the data block.

TABLE 1

| Value of the data block | Configuration information/Triggering state |
| --- | --- |
| 00 | Triggering state-0 |
| 01 | Triggering state-1 |
| 10 | Triggering state-2 |
| 11 | Triggering state-3 |

In some examples, multiple user devices which are configured with a same parameter set can be indicated by a same data block. In this embodiment, the triggering states of multiple user devices are coded in one DCI payload. Thus, the resource overhead can be much reduced compared with the scheme that encodes the triggering states of multiple user devices separately.

In some implementations, the user device is configured with a position information. In some implementations, the position information is used to configure the UE for extracting the triggering state from the DCI payload. In some implementations, the interpretation of the triggering state of user device is associated with the position information. In some implementations, the position information includes a starting position or/and ending position of a data block. In some implementations, the position information includes the index to the block number. In some implementations, the position information includes the bit width of the data block or the size of the data block field. In some implementations, the position information is configured by a higher layer signaling. In some implementations, the higher layer signaling includes a RRC signaling or MAC CE.

Embodiment 2

In some implementations, when the control signaling includes N data blocks, N equals to 1. In some implementation, the triggering states of M user devices or multiple user devices are jointly coded. The triggering states of the M user devices or multiple user devices are jointly coded and indicated by a single value of the data block.

The examples of the values of the data block is defined in Table 2. In this example, the triggering states or configuration of multiple, e.g. M, user devices are jointly coded and indicated by a single value of the data block. In this example, there are 3 user devices (UE-0, UE-1, UE-2) and each of the user devices has 3 triggering states (with indices of 0,1,2). The value or codepoint of "0" indicates the triggering state with index=0 for UE-0, the triggering state with index=0 for UE-1 and the triggering state with index=0 for UE-2. The value or codepoint of "1" indicates the triggering state with index=1 for UE-0, the triggering state with index=0 for UE-1 and the triggering state with index=0 for UE-2, and so on.

TABLE 2

| Value of the code block | Index of triggering state for UE-0 | Index of triggering state for UE-1 | Index of triggering state for UE-2 |
|---|---|---|---|
| 0 | 0 | 0 | 0 |
| 1 | 1 | 0 | 0 |
| 2 | 2 | 0 | 0 |
| 3 | 0 | 1 | 0 |
| 4 | 1 | 1 | 0 |
| 5 | 2 | 1 | 0 |
| 6 | 0 | 2 | 0 |
| 7 | 1 | 2 | 0 |
| 8 | 2 | 2 | 0 |
| 9 | 0 | 0 | 1 |
| 10 | 1 | 0 | 1 |
| 11 | 2 | 0 | 1 |
| 12 | 0 | 1 | 1 |
| 13 | 1 | 1 | 1 |
| 14 | 2 | 1 | 1 |
| 15 | 0 | 2 | 1 |
| 16 | 1 | 2 | 1 |
| 17 | 2 | 2 | 1 |
| 18 | 0 | 0 | 2 |
| 19 | 1 | 0 | 2 |
| 20 | 2 | 0 | 2 |
| 21 | 0 | 1 | 2 |

TABLE 2-continued

| Value of the code block | Index of triggering state for UE-0 | Index of triggering state for UE-1 | Index of triggering state for UE-2 |
|---|---|---|---|
| 22 | 1 | 1 | 2 |
| 23 | 2 | 1 | 2 |
| 24 | 0 | 2 | 2 |
| 25 | 1 | 2 | 2 |
| 26 | 2 | 2 | 2 |

In this implementation, the triggering states of multiple user devices are jointly coded in one data block and indicated by one value of the data block. Thus, the payload size can be reduced and the performance can be improved, as compared with Embodiment 1. To be more specific, in the case when there are 3 user devices and each has 3 triggering states, there are 2 (three triggering states)×3 (number of user devices)=6 bits needed for Embodiment 1. For Embodiment 2, however, 5 bits are enough to indicate the 3*3*3=27 combinations. Thus, in this example, one bit can be reduced. In the cases of different number of user devices and different number of triggering states for each user device, more examples of the number of reduced payload bits over Embodiment 1 is given in Table 3.

TABLE 3

| Number of triggering states for each user device | Number of user device | | | | |
|---|---|---|---|---|---|
| | 3 | 5 | 9 | 17 | 33 |
| 2 | 0 | 1 | 1 | 1 | 1 |
| 4 | 1 | 2 | 3 | 3 | 3 |
| 6 | 2 | 4 | 4 | 5 | 5 |
| 8 | 3 | 5 | 6 | 7 | 7 |
| 10 | 4 | 6 | 8 | 9 | 9 |
| 12 | 4 | 8 | 9 | 10 | 11 |
| 14 | 5 | 9 | 11 | 12 | 13 |
| 16 | 6 | 10 | 13 | 14 | 15 |

Figure 7:
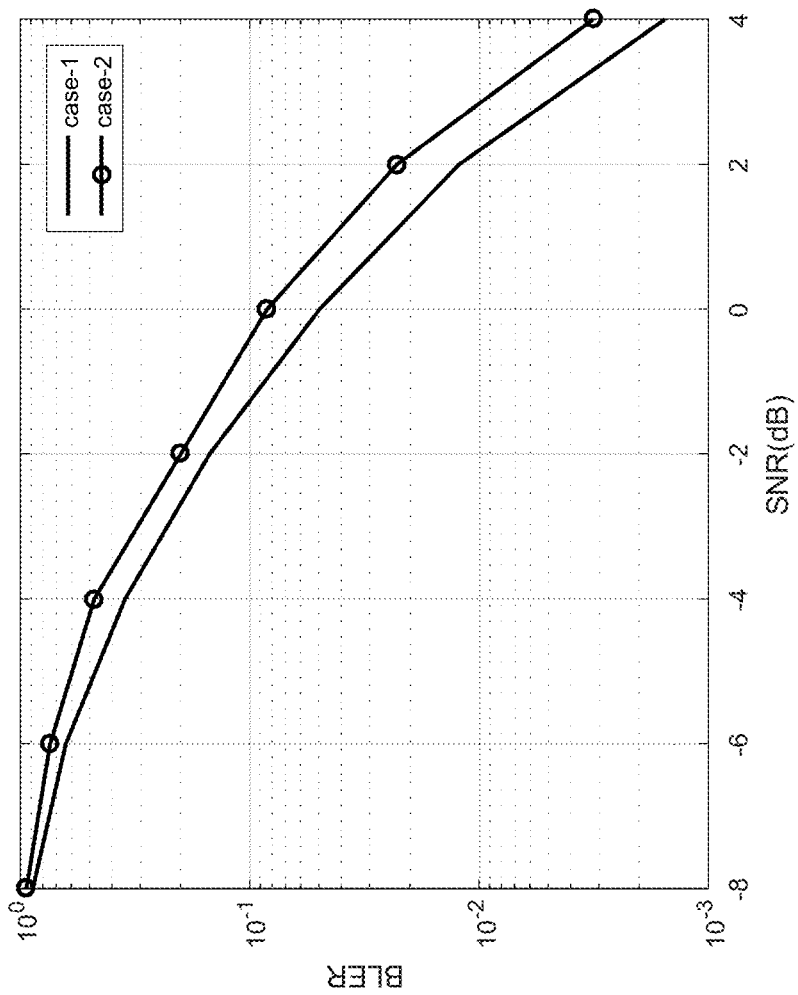
FIG. 7 shows an example of BLER (block error rate) performance simulation based on some implementations of the disclosed technology.
Figure 8:
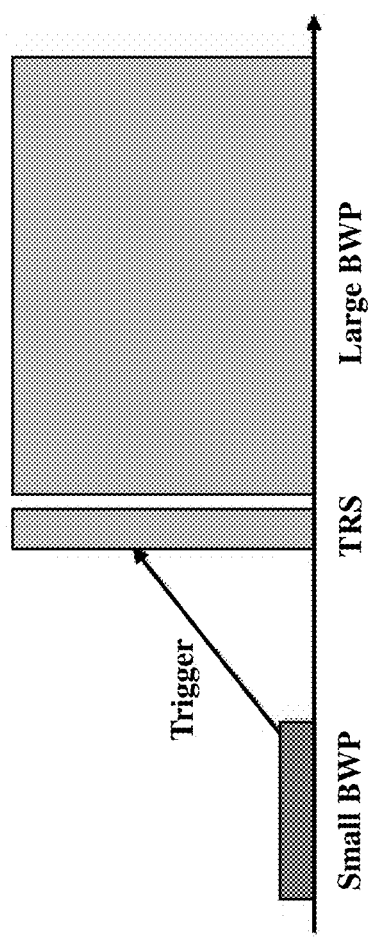
FIG. 8 shows an example of a BWP (Bandwidth Part) switching indication associated with a reference signal based on some implementations of the disclosed technology.

In those implementations, the triggering states or configuration information are coded together to reduce resource overhead and improve the performance of the wireless communication system. An example of BLER (block error rate) performance is given in FIG. 7. In FIG. 7, the legend of "case-1" is the performance employing techniques discussed as Embodiment-2 when there are 8 user devices and each has 17 triggering states, the legend of "case-2" is the performance employing techniques discussed as Embodiment-1.

In some implementations, the triggering state of the user device indicated by the network is determined by or associated with at least one of the following: the value of the data block, the number of triggering states of each user device, the mapping order of the M user devices, the number of triggering states of previous user devices, the number of triggering states of the user devices with less significant position, the number of triggering states of the user devices with higher mapping order, the mapping order of the previous user devices, the order of user devices with less significant position, the order of user devices with higher mapping order, the mapping position of the user device, or the number of triggering states of the user device.

In some implementations, the value of the data block is determined by or associated with at least one of the following: the triggering state of the user device indicated by the network, the number of triggering states of each user device, the mapping order or index of the M user devices, the number of triggering states of previous user devices, the number of triggering states of the user devices with less significant position, the number of triggering states of the user devices with higher mapping order, the mapping order or index of the previous user devices, the order of user devices with less significant position, the order of user devices with higher mapping order, the mapping order or index of the user device, or the number of triggering states of the user device.

In some implementations, the mapping order of the M user devices includes the order that formulates the value of the data block. In some example, the value of the data block C is determined by the following equation:

$$C=a(\text{Inf-UE-0})+b(\text{Inf-UE-1},\text{Inf-UE-0})+c(\text{Inf-UE-2},\text{Inf-UE-1},\text{Inf-UE-0})+\ldots+d(\text{Inf-UE-N-1},\text{Inf-UE-N-2},\ldots,\text{Inf-UE-1},\text{Inf-UE-0}).$$

In some examples, $t0=e(C,\text{Inf-UE-0})$, $t1=f(C,\text{Inf-UE-0},\text{Inf-UE-1})$, $t2=g(C,\text{Inf-UE-0},\text{Inf-UE-1},\text{Inf-UE-2})$, ..., $tN-1=h(C,\text{Inf-UE-0},\text{Inf-UE-1},\text{Inf-UE-2}\ldots,\text{Inf-UE-N-1})$, wherein the $a(x)$, $b(x)$, $c(x)$, $d(x)$, $e(x)$, $f(x)$, $g(x)$ and $h(x)$ denote the functions of x, and ti denotes the indicated triggering states of user devices, $0 \le i \le N-1$, and Inf-UE-i denotes the information of UE-i, $0 \le i \le N-1$.

In some implementations, the codepoints or value of a data block and the triggering state of the user device is determined as follows:

TABLE 4 t0=mod (C, T0);
t1=mod (operation-1(C/T0), T1);
t2=mod (operation-2(C/(T0*T1)), T2);
t3=mod (operation-3(C/(T0*T1*T2)), T3);
....
tN-1=mod (operation-N-1(C/(T0*T1*T2*...*TN-2)), TN-1).
wherein Ti is the number of triggering states of the ith user device, Ti is natural number for $0 \le i \le N-1$;
ti is an index of the indicated triggering states of the ith user device, ti is natural number for $0 \le i \le N-1$;
C is the codepoint of the data block; the operation-i is ceil, floor or round operation for $0 \le i \le N-1$.

In some implementations, the codepoints or value of a data block and the triggering state of the user device is determined as follows:

TABLE 5

T_temp=1;
for i=0:N-1
  ti=mod(operation-i(C/T_temp),Ti);
  T_temp=T_temp*Ti;
end
wherein Ti is the number of triggering states of the ith user device, Ti is natural number for $0 \le i \le N-1$;
ti is an index of the indicated triggering states of the ith user device, ti is natural number for $0 \le i \le N-1$;
C is the codepoint of the data block;
the operation-i is cell, floor or round operation for $0 \le i \le N-1$.

In some implementations, the codepoints or value of a data block and the triggering state of the user device is determined as follows: $C=t0+t1*T0+t2*T0*T1+\ldots+t(N-1)*T0*T1*T2*T(N-2)$, wherein Ti is the number of triggering states of the i-th user device, Ti is natural number for $0 \le i \le N-1$; ti is an index of the triggering states of the i-th user device, ti is natural number for $0 \le i \le N-1$; C is the codepoint of the data block.

In the examples, the mapping order of the user devices is UE-0, UE-1, UE-2 ... UE-N-1. In the examples, the user device with a smaller index is prior to or previous to the user device with a larger index. In the examples, the user device with a smaller index has a less significant position. In the examples, the user device with a smaller index has a higher mapping order.

In some implementations, a predefined condition includes at least one of the following: i) the trigger state of UE-i indicated by the data block is derived by or associated with if the information or parameters of UE-j, ii) the derivation of trigger state of UE-j indicated by the data block does not need or associated with the information or parameters of UE-i. wherein i and j are different user device indices, i and j are natural numbers.

In the examples, when predefined condition is fulfilled, the user device UE-j is prior to or previous to the user device UE-i. In the examples, when predefined condition is fulfilled, the user device UE-j has a less significant position than user device UE-i. In the examples, the user device UE-j has a higher mapping order than user device UE-i.

In some implementations, the mapping order is represented by the indices of the user devices. In some example, the user device with smaller index has a lower mapping order. In some example, the user device with larger index has a lower mapping order.

Take the Table 2 as an example. There are 3 user devices (UE-0, UE-1, UE-2) and each of the user devices has 3 triggering states (with indices of 0,1,2). If the value of the data block is 3, the trigger index of UE-0 is $t0=\text{mod}(C,T0)=\text{mod}(3,3)=0$, $t1=\text{mod}(C/T0,T1)=\text{mod}(\text{floor}(3/3),3)=1$, $t2=\text{mod}(C/T0/T1,T2)=\text{mod}(\text{floor}(3/3/3),3)=1$. Conversely, if the indices of indicated triggering state of UE-0, UE-1, and UE-2 are 2,1,1, the value of the data block is $C=t0+T0*t1+T0*T1*t2=2+3*1+3*3*1=14$.

In some implementations, the user device is configured with at least one of the following: information of the number of triggering states of each user device, information of the mapping order or index of the M user devices, information of the number of triggering state of previous user devices, the number of triggering states of the user devices with less significant position, the number of triggering states of the user devices with higher mapping order, the mapping order or index of the previous user devices, the order of user devices with less significant position, the order of user devices with higher mapping order, the mapping order or index of the user device, or the number of triggering states of the user device.

In some implementation, the information of the number of triggering states of each user device or the previous user devices or user device with less significant position or user device with higher mapping order is in a format of list or set. In some implementation, the indices in the list or set indicates the mapping order. For example, there are three user devices, and the user device is configured with a list of values [3,5,7] which correspond to the number of triggering states for UE-0, UE-1, UE-3, respectively. In the example, the mapping order is UE-0 first, then UE-1 and finally UE-2.

In some implementations, the triggering states indicated by the block is determined by or associated with the information of a previous user device or a user device with less significant position or a user device with higher mapping order. For example, there are three user devices previous, and the user device is configured with a list of values [3,5,7] which correspond to the number of triggering states for UE-0, UE-1, UE-3, respectively.

For example, when there are three previous user devices, the fourth user device may be configured with a list of values [3,5,7] which correspond to the number of triggering states for the first three user devices. For example, when there are three user devices with less significant position or higher mapping order, the fourth user device may be configured with a list of values [3,5,7] which correspond to the number of triggering states for the first three user devices.

In some implementation, the information of the number of triggering states of each user device or the previous user devices or a user device with less significant position or a user device with higher mapping order is in a format of differential value. With the help of the differential manner, the overhead of the signaling can be reduced.

In some implementation, the triggering states indicated by the data block is determined by or associated with the mapping order or index of the user device and the number of triggering states of the user device. In some implementation, the number of triggering states of user devices are the same. The user device can interpret the triggering states indicated by the data block with its mapping order or index and the number of triggering states.

In some example, the indicated triggering state is ti=mod (operation-i(C/T_temp),T), where in T_temp=T^(i) for $0 \leq i \leq N-1$, T is the number of triggering states of each user device, T is natural number; ti is an index of the indicated triggering states of the ith user device, ti is natural number for $0 \leq i \leq N-1$; C is the codepoint of the data block; the operation-i is ceil, floor or round operation for $0 \leq i \leq N-1$. In this example, "^" is used to indicate the power function and thus, T^(i) indicates T.

In some example, the indicated triggering state is C=t0+t1*T+t2*T^2+ . . . . +t(N−1)*T^(N−2). wherein T is the number of triggering states of each user device, T is natural number; ti is an index of the indicated triggering states of the ith user device, ti is natural number for $0 \leq i \leq N-1$; C is the codepoint of the data block.

Both Embodiment-1 and Embodiment-2 can reduce the resource overhead and blocking rate, while Embodiment-2 can further reduce the size of the payload.

In some implementations, the control signaling can be included in a first set of a DCI formats or candidates. The first set of DCI formats or candidates has a higher mapping priority than the second set of DCI formats or candidates. The first set of DCI formats or candidates and the second DCI formats or candidates are differentiated by at least one of the following: DCI format, RNTI ((Radio network temporary identifier), search space configuration, CORESET (control resource set) configuration, time resources, or frequency resources. In some embodiments, the second set of DCI formats or candidates includes at least one of the following: DCI format 0-0, DCI format 0-1, DCI format 1-0, DCI format 1-1, DCI format 2-0, DCI format 2-1, DCI format 2-2, DCI format 2-3. In some embodiments, the first set of DCI formats or candidates is DCI format other than DCI format 0-0, DCI format 0-1, DCI format 1-0, DCI format 1-1, DCI format 2-0, DCI format 2-1, DCI format 2-2, DCI format 2-3. In some embodiments, the second set of DCI formats or candidates is DCI with CRC scrambled by at least one of the following: C-RNTI, CS-RNTI, MCS-C-RNTI, TC-RNTI, SP-CSI-RNTI, P-RNTI, SI-RNTI, RA-RNTI, TC-RNTI, SFI-RNTI, INT-RNTI, TPC-PUSCH-RNTI, TPC-PUCCH-RNTI. In some embodiments, the first set of DCI format is DCI with CRC scrambled by RNTI other than C-RNTI, CS-RNTI, MCS-C-RNTI, TC-RNTI, SP-CSI-RNTI, P-RNTI, SI-RNTI, RA-RNTI, TC-RNTI, SFI-RNTI, INT-RNTI, TPC-PUSCH-RNTI, TPC-PUCCH-RNTI. In some embodiments, the resource configured to the first set of DCI formats or candidates is not expected to be occupied by the second set of DCI formats or candidates.

In some implementations, the control signaling can be included in a first set of DCI formats or candidates with CRC scrambled by PS-RNTI. The usage of PS-RNTI includes at least one of the following: reducing power consumption, indicating wake-up, indicating go-to-sleep, reduce PDCCH (Physical Downlink Control Channel) monitoring occasion, switching BWP (Bandwidth Part), indicating spatial information, indicating time domain resource allocation, indicating QCL (Quasi-co-location) information, indicating SRS (Sounding Reference Signals) request, or indicating CSI (Channel State Information) request.

In some implementations, the data block includes Field-1 and other fields. The Field-1 of the data block includes one of the following configuration information 1-10. As an example, Field-1 includes the wake-up indication and other fields include information of other configurations or triggering states.

Triggering State

The triggering state of the user device is indicated by the data block. In some implementation, the N data blocks includes T triggering states of M user devices. In some embodiment, N equals to 1. In some implementations, the triggering states include a wake-up indication. For example, the triggering states may include one wake-up indication for one user device.

In some implementations, the triggering state includes a wake-up indication. In some implementations, the triggering state includes a go-to-sleep indication. In some implementations, the triggering state includes a PDCCH (Physical Downlink Control Channel) monitoring occasion indication. In some implementations, the triggering state includes a BWP (Bandwidth Part) indicator. In some implementations, the triggering state includes spatial information. In some implementations, the triggering state includes a time domain resource allocation. In some implementations, the triggering state includes QCL (Quasi-co-location) information. In some implementations, the triggering state includes a SRS (Sounding Reference Signals) request. In some implementations, the triggering state includes a CSI (Channel State Information) request.

As an example, the triggering state is represented as {conf-1, conf-2 . . . conf-n}, wherein 'n' is positive. As an example, "conf-1" indicates the wake-up indication, "conf-2" indicates information of PDCCH monitoring occasion, and so on.

Configuration Information 1

In some implementation, the information of wake-up indicates whether UE needs to monitor a second set of PDCCH candidates in a predefined period. In some implementation, the information of wake-up indicates whether UE needs to monitor PDCCH in a predefined period. In some implementation, the information of wake-up indicates whether UE needs to monitor a second set of PDCCH candidates. In some implementation, the information of wake-up indicates whether UE needs to monitor PDCCH. In some implementation, the information of wake-up indicates the transition of DRX status.

In some implementation, the information of wake-up includes a wake-up indication. In some implementation, the wake-up indication indicates UE needs to monitor a second set of PDCCH candidates in a predefined period. In some implementation, the wake-up indication indicates UE needs to monitor PDCCH in a predefined period. In some implementation, the wake-up indication indicates UE needs to monitor a second set of PDCCH candidates. In some implementation, the wake-up indication indicates UE needs to monitor PDCCH. In some implementations, the wake-up indication indicates the transition of DRX-off or DRX inactive time to DRX-on or DRX active time.

In some implementations, the information of wake-up includes a go-to sleep indication. In some implementation, the go-to-sleep indication indicates UE does not need to or is not required to monitor a second set of PDCCH candidates in a predefined period. In some implementation, the go-to-sleep indication indicates UE does not need to or is not required to monitor PDCCH in a predefined period. In some implementation, the go-to-sleep indication indicates UE does not need to or is not required to monitor a second set of PDCCH candidates. In some implementation, the go-to-sleep indication indicates UE does not need to or is not required to monitor PDCCH. In some implementations, the go-to-sleep indication indicates the transition of DRX-on or DRX active time to DRX-off or DRX inactive time.

In some implementations, regarding the information about whether the UE needs to monitor the second set of PDCCH candidates or PDCCH candidates in the predefined period, the predefined period includes at least one of: i) following A DRX cycles. Wherein A is a positive number. Wherein the DRX cycle is a long DRX cycle or a short DRX cycle, ii) following B PDCCH monitoring cycles. Wherein B is a positive number.

In some implementations, the PDCCH monitoring cycle equals the periodicity of the search space of the corresponding PDCCH candidates. In this case, the PDCCH monitoring behavior is treated per search space. For example, when the UE is configured with two PDCCH search spaces, i.e., search space 1 with periodicity 1 and search space 2 with periodicity 2, assume that the information conveyed in the DCI indicates that the UE does not need to monitor PDCCH in the following 2 PDCCH monitoring cycles. In this case, for the search space 1, the UE does not need to monitor PDCCH candidates in the following 2 cycles of a duration equals 2 times periodicity 1. For the search space 2, the UE also does not need to monitor PDCCH candidates in the following 2 cycles of a duration that equals 2 times periodicity 2.

In some implementations, the PDCCH monitoring cycle equals the maximum or minimum periodicity of all the search spaces. In some implementations, the PDCCH monitoring cycle equals the maximum or minimum periodicity of the search spaces of the second set of PDCCH candidates. For example, if the UE is configured with two PDCCH search spaces, i.e., search space 1 with periodicity 1 and search space 2 with periodicity 2, wherein periodicity 1 is smaller than periodicity 2, assume that the information conveyed in the DCI indicates that the UE does not need to monitor PDCCH in the following 2 PDCCH monitoring cycles. In this case, for both search space 1 and search space 2, the UE does not need to monitor PDCCH candidates in the following 2 cycles of a duration that equals 2 times periodicity 1. The duration of the inactive time of the UE is 2 times the maximum of periodicity of periodicity 1 and periodicity 2. Wherein the inactive time is the period that UE is not required to monitor PDCCH.

In some implementations, the second set of PDCCH candidates include at least one of the following: i) the DCI format with CRC scrambled by C-RNTI, CS-RNTI, MCS-C-RNTI, TC-RNTI, SP-CSI-RNTI, P-RNTI, SI-RNTI, RA-RNTI, TC-RNTI, SFI-RNTI, INT-RNTI, TPC-PUSCH-RNTI, TPC-PUCCH-RNTI, ii) DCI format 0-0, DCI format 0-1, DCI format 1-0, DCI format 1-1, DCI format 2-0, DCI format 2-1, DCI format 2-2, DCI format 2-3.

In some implementations, the first set of PDCCH candidates include DCI format with CRC scrambled by PS-RNTI.

In some implementations, the bit width of the i-th block can be 1 wherein 0≤i≤N−1.

In some implementations, when the value of the i-th block is value_1, it means that the UE needs to monitor a second set of PDCCH candidates or PDCCH candidates in the next N DRX cycles; when the value of the i th block is value_2, it means that the UE does not need to monitor the second set of PDCCH or PDCCH candidates in the next N DRX cycles. In some implementations, when the value of the i-th block is all 0s, it means that the UE does not need to monitor the second set of PDCCH candidates or PDCCH candidates in the next N DRX cycles, which means "not wake up" or "go to sleep."

In some implementations, when the value of the i-th block is value_1, it means that the UE needs to monitor a second set of PDCCH candidates or PDCCH candidates in the next N DRX cycles; when the value of the i th block is value_2, it means that the UE does not need to monitor the second set of PDCCH or PDCCH candidates in the next N DRX cycles. In some implementations, when the value of the i-th block is all 0s, it means that the UE does not need to monitor the second set of PDCCH candidates or PDCCH candidates in the next N DRX cycles, which means "not wake up" or "go to sleep."

In some implementations, when the value of the i-th block is value_1, it means the transition of DRX-on or DRX active time to DRX-off or DRX inactive time; when the value of the i-th block is value_2, it means the transition of DRX-off or DRX inactive time to DRX-on or DRX active time. In some implementations, when the value of the i-th block is all 0s, it means the transition of DRX-on or DRX active time to DRX-off or DRX inactive time.

With the indication of wake-up information, UE does not need to wake up or can skip monitoring PDCCH, which is beneficial to the power consumption.

Configuration Information 2

Configuration information 2 may include information about BWP (bandwidth part) indicator. If the UE does not support active BWP change via DCI, the UE ignores this information. Examples 1 to 3 are discussed in the below.

Example 1: The bit width for this configuration information is determined as $\lceil \log_2(n_{BWP}) \rceil$ bits, where $n_{BWP}=n_{BWP,RRC}+1$ if $n_{BWP,RRC} \leq 3$, in which case the bandwidth part indicator is equivalent to the ascending order of the higher layer parameter BWP-Id. Wherein $n_{BWP,RRC}$ is the number of DL BWPs configured by higher layers, excluding the initial DL bandwidth part.

Otherwise $n_{BWP}=n_{BWP,RRC}$, in which case the bandwidth part indicator is defined in Table 6.

If the UE does not support active BWP change via DCI, the UE ignores this information.

TABLE 6

Bandwidth part indicator

| Value of BWP indicator field 2 bits | Bandwidth part |
|---|---|
| 00 | Configured BWP with BWP-Id =1 |
| 01 | Configured BWP with BWP-Id =2 |
| 10 | Configured BWP with BWP-Id =3 |
| 11 | Configured BWP with BWP-Id =4 |

Example 2: The bit width for this configuration information is determined as $\lceil \log_2(n_{BWP}) \rceil$ bits, where $n_{BWP}=n_{BWP,RRC}+1$ if $n_{BWP,RRC} \leq 3$, in which case the bandwidth part indicator is equivalent to the ascending order of the higher layer parameter BWP-Id; Wherein $n_{BWP,RRC}$ is the number of UL BWPs configured by higher layers, excluding the initial UL bandwidth part Otherwise $n_{BWP}=n_{BWP,RRC}$, in which case the bandwidth part indicator is defined in Table 6.

Example 3: In some implementations, the BWP switching indication can be associated with a reference signal. In this case, the triggering state in the data block indicates the BWP switching from the small BWP to the large BWP. A set of reference signal (TRS in FIG. 7 but it can also be other CSI-RS, or both, or other reference signal like PT-RS) is transmitted after $T_{BWPswitchDelay}$. In this example, the UE can derive the channel condition or beam information of the large BWP soon after the BWP switching which is beneficial to improve the network performance.

For DCI-based BWP switch, after the UE receives BWP switching request at slot n on a serving cell, the UE may be able to receive PDSCH (for DL active BWP switch) or transmit PUSCH (for UL active BWP switch) on the new BWP on the serving cell on which BWP switch occurs no later than at slot $n+T_{BWPswitchDelay}$.

TABLE 7

Example of BWP switch delay

| μ | NR Slot length (ms) | BWP switch delay $T_{BWPswitchDelay}$ (slots) | |
| --- | --- | --- | --- |
| | | Type 1$^{Note\ 1}$ | Type 2$^{Note\ 1}$ |
| 0 | 1 | 1 | 3 |
| 1 | 0.5 | 2 | 5 |
| 2 | 0.25 | 3 | 9 |
| 3 | 0.125 | 6 | 17 |

Note 1:
Depends on UE capability.
Note 2:
If the BWP switch involves changing of SCS, the BWP switch delay is determined by the larger one between the SCS before BWP switch and the SCS after BWP switch.

In some implementations, the downlink control signaling includes and identifier for DCI format. The field of the identifier for DCI formats is 1 bit indicating an uplink or downlink BWP (bandwidth part) indicator. The indication bit can be separately configured for each block or common to all blocks. In some implementations, the value of the data block with all 0s indicates no BWP switching.

With a proper indication of BWP indicator in the first set of PDCCH candidates, it is more beneficial for UE to switch to larger BWP for large packet reception or transmission, and use small BWP to monitoring PDCCH candidates. In addition, the BWP switching associated with reference signal improve the network performance.

Configuration Information 3

Configuration information 3 includes information about PDCCH monitoring occasion of the second set of PDCCH candidates or PDCCH candidates. The information about PDCCH monitoring occasion includes at least one of the following: PDCCH monitoring periodicity, the PDCCH monitoring duration, the PDCCH monitoring offset, the PDCCH monitoring pattern within a slot, search space activation, search space deactivation, CORESET activation or CORESET deactivation.

For example, when the data block indicates the first PDCCH detection period information, the second PDCCH detection period information, . . . or the Mth PDCCH detection period information, the PDCCH monitoring periodicity of the second set of PDCCH candidate or PDCCH candidates times $a_1, a_2, \ldots$ or $a_M$, respectively, wherein $a_1, a_2, \ldots a_M$ are positive numbers, i.e., $a_1, a_2, \ldots, a_M \geq 1$.

For example, when the data block indicates the first PDCCH monitoring duration information, the second PDCCH monitoring duration information, . . . or the Mth monitoring duration PDCCH information, the PDCCH monitoring duration of the second set of PDCCH candidate or PDCCH candidates times $b_1, b_2, \ldots$ or $b_M$, wherein $b_1, b_2, \ldots b_M$ are positive numbers. i.e., $b_1, b_2, \ldots b_M \leq 1$.

In some implementation, the indication of the search space deactivation indicates that the UE is not required or expected to monitor PDCCH in the deactivated search space. The indication of search space activation indicates UE is required or expected to monitor PDCCH in the activated search space.

In some implementation, the indication of the search space deactivation indicates that the UE is not required or expected to monitor the corresponding PDCCH candidates of the deactivated search space. The indication of search space activation indicates UE is required or expected to monitor the corresponding PDCCH candidates of the activated search space.

For example, when the value of the i-th block is all 0s, it means that the PDCCH monitoring occasion information does not change.

With a dynamic indication of PDCCH monitoring occasion, it is more beneficial for UE to adapt to traffic arriving and reduce power consumption.

Configuration Information 4

Configuration information 4 includes information about spatial information. The spatial information includes at least one of the following: (maximum) number of MIMO layers, (maximum) number of transmission layers, (maximum) number of antenna ports, (maximum) number of antenna panel. For example, when the value of the block is all 0, it means that one or more spatial information is unchanged. In some example, the transmission layer or MIMO layer is that the transport block is mapped onto.

With a dynamic indication of spatial information, it is more beneficial for UE to adapt to traffic arriving and reduce power consumption.

Configuration Information 5

Configuration information 5 includes information about time domain resource allocation of PDSCH/DL assignment. Configuration information 5 includes information about time domain resource allocation of PUSCH/UL assignment. Configuration information 5 includes information about time domain resource allocation of A-CSI offset. The time domain resource allocation includes at least one of the following: (minimum) K0, (minimum) K1, (minimum) K2, (minimum) A-CSI (aperiodic CSI) offset. For example, when the value of the block is all 0s, it means that one or more time domain resource allocations is unchanged.

With a indication of time domain resource allocation information, it is beneficial for UE to know the information in advance to PDCCH decoding which helps UE adapt to traffic arriving and reduce power consumption.

Configuration Information 6

Configuration information 6 includes the SRS request. In some implementations, the control signaling includes a SRS request, or the control signaling associates a SRS request. In some implementations, the SRS request includes a resource allocation indication. In some implementations, the resource allocation of SRS or PUCCH for reporting or PUSCH for reporting has a predefined offset relative to the first set of PDCCH candidates. In some implementations, the resource allocation of SRS or PUCCH for reporting or PUSCH for reporting has a predefined offset relative to DRX-on or DRX active or the timing of SS(synchronization signal)/PBCH (physical broadcast channel).

With a indication of SRS request, it is beneficial for UE or network to know the information of channel condition in advance which helps improve the performance.

Configuration Information 7

Configuration information 7 includes a CSI request. In some implementations, the control signaling includes a CSI request, or the control signaling associates a CSI request. In some implementations, the CSI request includes a resource allocation indication. In some implementations, the resource allocation of CSI-RS or PUCCH for reporting or PUSCH for reporting has a predefined offset relative to the first set of PDCCH candidates. In some implementations, the resource allocation of CSI-RS or PUCCH for reporting or PUSCH for reporting has a predefined offset relative to DRX-on or DRX active or the timing of SS(synchronization signal)/PBCH (physical broadcast channel).

With a indication of CSI request, it is beneficial for UE or network to know the information of channel condition in advance which helps improve the performance.

Configuration Information 8

Configuration information 8 includes beam or QCL information. In some implementations, the beam information or antenna port quasi co-location information of the second set of PDCCH candidates is associated with or determined by the first set of PDCCH candidates. For example, beam information or antenna port quasi co-location information of the second set of PDCCH is indicated by the first set of PDCCH candidates. In another example, beam information or antenna port quasi co-location information of the second set of PDCCH may be associated with first set of PDCCH candidates if they are overlapped in some domains. The domain includes CORESET, search space, time resource or frequency resource.

With an indication of beam or QCL information, it is beneficial for UE or network to know the information of channel condition in advance which helps improve the performance.

Configuration Information 9

Configuration information 9 includes operation of the secondary cell. Configuration information 9 includes operation of the primary cell and secondary cell. In some implementations, the operation of the secondary cell includes Scell deactivation or Scell activation or indication of a dormant Scell or indication of PDCCH monitoring occasions in scell. In some implementations, the Scell deactivation indicates UE is not required or expected to monitor the PDCCH candidates of the deactivated Scell. In some implementations, the Scell activation indicates the UE is required or expected to monitor the corresponding PDCCH candidates of the activated Scell. In some implementations, the UE is not required or expected to monitor the PDCCH in the dormant Scell. In some implementations, the UE is required or expected to do the measurement, such as beam management, RRM measurement, CSI measurement or CSI acquisition, in the dormant Scell.

With a indication of operation of the secondary cell in a dynamic way, it is beneficial for UE to reduce to PDCCH monitoring which helps UE adapt to traffic arriving and reduce power consumption.

In some implementations, the downlink control signaling includes at least one of the following: an identifier for DCI format, functionality indicator, N data blocks, wherein N is a positive number. The field of the identifier for DCI formats is 1 bit indicating an uplink or downlink BWP (bandwidth part) indicator. The indication bit can be separately configured for each block or common to all blocks. The items/aspects included in the downlink control signaling is further discussed in the below.

Functionality Indicator

The functionality indicator of the triggering state or data block includes at least one of the following functionalities 1 to 10:
1. Wake-up indication
2. Sleep indication
3. PDCCH monitoring occasion information indication
4. BWP switching information indication
5. Scell operation indication
6. Spatial information.
7. Time domain resource allocation indication
8. SRS (Sounding Reference Signal) request
9. CSI (Channel State Information) request
10. QCL information indication In a specific example, there exists or configures M functionalities. The bit width for functionality indicator can be obtained based on the equation, log 2(M). To indicate the 8 functionalities of the listed above, 3 bits are needed. For example, "000" indicates "wake up", "001" indicates PDCCH monitoring occasion information, and so on.

In some implementations, the functionality indicator is designed to indicate the functionality of all the blocks in the DCI or the functionality of one or more blocks in the DCI. When the functionality indicator indicates the functionality of all the blocks in the DCI, all the blocks in the DCI payload share the same functionality indicator. It allows to reduce the payload and enhance the performance. When the functionality indicator indicates the functionality of one or more blocks in the DCI, the blocks in the DCI payload can have separate indicators. It provides more flexibility.

In some implementations, the functionality indicator of the triggering state or data block is indicated by a downlink control signaling. In some implementations, the functionality indicator of the triggering state or data block is indicated by higher layer signaling. In an example, the higher layer signaling includes RRC signaling or MAC CE.

Bit Width

In some implementations, the bit width of each block is related to at least one of following: at least one high layer parameter, a functionality indicator, a RNTI (Radio network temporary identifier), or a UE-ID (UE specific identifier). In an example, the higher layer parameter indicates the functionality of the DCI, or one or more data blocks in the DCI payload or triggering states. In an example, at least one higher layer parameter indicates the bit width of the DCI, or one or more blocks in the DCI or triggering states. In an example, at least one higher layer parameter includes RRC signaling or MAC CE. The bit width indicated by at least one higher layer parameter is a maximum value. In some implementations, the functionality indicator is included in the RRC signaling, MAC CE or DCI. In some implementations, the RNTI includes PS-RNTI. In some implementations, the RNTI excludes C-RNTI, CS-RNTI, MCS-C-RNTI, TC-RNTI, SP-CSI-RNTI, P-RNTI, SI-RNTI, RA-RNTI, TC-RNTI, SFI-RNTI, INT-RNTI, TPC-PUSCH-RNTI, TPC-PUCCH-RNTI.

In some implementations, the UE is indicated with at least one of the following: i) a position in the DCI payload, or ii) a mapping rule. In some implementations, the control signaling is dictated by a UE-set specific PDCCH. The UE needs to know how to interpret the DCI after PDCCH decoding, or UE needs to know what information is indicated from the BS. The items i) to ii) are discussed more detail in the below.
  i) A position in the DCI payload. The UE is configured with the information indicating which part of the DCI payload is used to convey its information. The position in the DCI payload can be a starting position in the DCI payload, or the end position in the DCI, or the block index. For example, assume that the payload is {b1, b2, b3, b4, b5, b6}, i.e., 6 bits are in the DCI, the UE is configured with the starting position of 3, and the bit width is 2. In this case, the bits b3 and b4 are used to convey the information to this particular UE. In another example, the DCI contents block #1, block #2, block #3, block #4, block #5. When the UE is configured with a block index of 3, then the block #3 is used to convey the information to this UE.
  ii) A mapping rule. In this case, the UE is configured with different triggering states. The mapping rule is related to the number of UE indicated by a same DCI and/or the number of triggering state of each UE. In this case, the UE0 is indicated a list of number of triggering states {T1 . . . TN} for UE1 to UEN.

Starting Position

The starting position of a block is determined by a higher layer parameter for one or more UEs configured with the block. The UEs configured with the same DCI payload are determined by higher layer parameter, traffic type, UE-ID, RNTI, or UE assistance information Embodiment 3

In some implementations, the control signaling may include:
  i) Field-1: one of the configuration information 1 to 9 indication. In some implementations, the field-1 includes configuration information-1 indication.
  ii) Field-Others: Other configuration information indication In some implementations, the bit field carrying configuration information 1 is the first or last field of the DCI format bit field or before/after bit fields with predefined size. If Field-1 indicates that the UE configuration parameters are unchanged, the corresponding Field-others value is 0 or padding bits. If Field-1 indicates a go-to-sleep indication or reserved entry, the corresponding Field-others value is 0 or padding bits. Alternatively, if the Field-1 indicates the UE configuration parameters are unchanged or a go-to-sleep indication or reserved entry, the size of bit field in the Field-others is W1. Otherwise, the size of bit field in the Field-others is W2. W1 and W2 are non-negative integers, and W1 is less than W2.

Example 1: The information carried in the control signaling includes:
Field-1:
  Block-1-1, block-1-2 . . . block-1-N; - - - B*W bits, Functionality 1 or 2 indication, wherein B and W are natural numbers.
Field-Others:
  Block-2-1, block-2-2 . . . block-2-N; - - - Other functionalities indication
  Block-3-1, block-3-2 . . . block-3-N; - - - Other functionalities indication
  Block-M-1, block-M-2 . . . block-M-N; - - - Other functionalities indication, wherein M is natural number.
Block-1-i and Block-m-j is associated, where i and j are positive numbers and 1≤m≤N. If the value of block-1-i is Value-1, Block-m-j is all-zeros or padding bits. If the value of block-1-i is Value-1, the bitwidth of Block-m-j is W1. If the value of block-1-i is Value-2, the bitwidth of Block-m-j is W2. W1 and W2 are non-negative, and W1 is not greater than W2.

Example 2: The information carried in the control signaling includes:
Field-1:
  - - - L bits - - - configuration information 1
Field-Others:
  - - - block 1, block 2 . . . block B - - - Other configuration indication In this case, the UE is indicated with go-to-sleep indication by the field-1, the corresponding block in the field-others are zeros or padding bits.

Information Jointly Coded in Block/DCI

In some implementations, the configuration information for one UE is jointly coded in the data block. In some implementations, the configuration information for one or more UEs is jointly coded in the DCI.

Indicator to Subset of UE Set

In some implementations, the control signaling includes an indicator to a subset of the UE set. The control signaling is transmitted to one or more UEs. For example, the control signaling is used in the case of multiple UEs. When the subset field of the control signaling is value_1, the data block or the control signaling is used to notify configuration parameters of a subset of the UE set. When the subset field of the control signaling is value_2, the data block or the control signaling is used to notify configuration parameters of the other subsets of the UE set.

In some implementations, the control signaling includes a CSI request, or the control signaling associates a CSI request. In some implementations, the SRS request is included in the control signaling. Alternatively, control signaling is associated with an SRS request.

In some implementations, the initial value of the DM-RS of PS-PDCCH is related to the PS-RNTI. In some implementations, the number of OFDM symbols occupied by the CORESET of the PDCCH with the control signaling is 1 or 2.

In some implementations, the REG mapping mode of the first set of PDCCH candidates includes no interleaving. In some implementations, the search space of PDCCH with the control signaling is common search space.

In some implementations, the data block field with all-zeros values indicates at least one of the following: 1) go-to-sleep indication; 2) same configuration information 2 as a predefined timing; 3) same configuration information 3 as a predefined timing; 4) same configuration information 4 as a predefined timing; 5) same configuration information 5 as a predefined timing; 6) same configuration information 6 as a predefined timing; 7) same configuration information 7 as a predefined timing; 8) same configuration information 8 as a predefined timing; 9) same configuration information 9 as a predefined timing. In some implementations, the predefined timing is when the first set of PDCCH candidates is received or transmitted or decoded.

In some implementations, the second set of PDCCH candidates cannot occupy the predefined resource. The predefined resource can be RRC configured for the first set of PDCCH candidates.

In some implementations, the configuration of the first set of PDCCH candidates is per cell or carrier.

Occasion for the PDCCH with the Control Signaling

There exist two different offsets including an offset between monitoring occasion of first set of PDCCH candidates provided by the corresponding search space and the DRX-on and an offset between monitoring occasion of the first set of PDCCH candidates provided by the corresponding search space and the second set of PDCCH candidates.

In some implementations, the offset between monitoring occasion of the first set of PDCCH candidates provided by the corresponding search space and the DRX-on is associated with or determined by i) a UE capability, ii) a PDSCH processing capability, ii) a PUSCH preparation time, or iii) BWP switching time.

In some implementations, the offset between monitoring occasion of the first set of PDCCH candidates provided by the corresponding search space and the monitoring occasion of second set of PDCCH candidates is associated with or determined by i) a UE capability, ii) a PDSCH processing capability, iii) a PUSCH preparation time, or iii) BWP switching time.

In some implementations, the monitoring occasion of the first set of PDCCH candidates or search space of the first set of PDCCH candidates is periodical. In one example, the periodicity of the monitoring occasion of the first set of PDCCH candidates or search space of the first set of PDCCH candidates is a multiple of the periodicity of DRX cycle. In another example, the periodicity of the monitoring occasion of the first set of PDCCH candidates or search space of the first set of PDCCH candidates is smaller than the periodicity of DRX cycle. The periodicity of monitoring occasion of the first set of PDCCH candidates or search space of the first set of PDCCH candidates is a multiple of the maximum periodicity of search space of the second set of PDCCH candidates. The periodicity of the monitoring occasion of the first set of PDCCH candidates or search space of the first set of PDCCH candidates can be a multiple of the minimum periodicity of search space of the second set of PDCCH candidates.

In some implementations, the monitoring occasion of the first set of PDCCH candidates can be after the start of the inactivity-timer. The monitoring occasion of the first set of PDCCH candidates is differentiated with the occasions of the second set of PDCCH in time domain and they are defined in different time occasions. The first set of PDCCH candidates has higher priority in mapping order than the second set of PDCCH. Thus, if the occasion of the first set of PDCCH is conflicted or overlapped with the second set of PDCCH, the first set of PDCCH candidates is transmitted first.

In some implementations, the blind decoding time for the first set of PDCCH candidates is 1. In some implementations, the beam information or antenna port quasi co-location information of the second set of PDCCH candidates is associated with or determined by the first set of PDCCH candidates. For example, beam information or antenna port quasi co-location information of the second set of PDCCH is indicated by the first set of PDCCH candidates. In another example, beam information or antenna port quasi co-location information of the second set of PDCCH may be associated with first set of PDCCH candidates if they are overlapped in some domains. The domain includes CORE-SET, search space, time resource or frequency resource.

Additional features and embodiments of the above-described methods/techniques are described below using a clause-based description format.

1. A wireless communication method, comprising: transmitting, by a network device, to a user device, a control signaling including N data blocks that indicate T triggering states of M user devices, and wherein N, T, and M are natural numbers and the triggering states indicate configuration information of the M user devices.
2. The wireless communication method of clause 1, wherein the triggering states include a wake-up indication.
3. The wireless communication method of clause 1, wherein the triggering states include a go-to-sleep indication.
4. The wireless communication method of clause 1, wherein the triggering states include a PDCCH (Physical Downlink Control Channel) monitoring occasion indication.
5. The wireless communication method of clause 1, wherein the triggering states include a BWP (Bandwidth Part) indicator.
6. The wireless communication method of clause 1, wherein the triggering states include spatial information.
7. The wireless communication method of clause 1, wherein the triggering states include information of time domain resource allocation.
8. The wireless communication method of clause 1, wherein the triggering states include information of QCL (Quasi-co-location) information.
9. The wireless communication method of clause 1, wherein the triggering states include a SRS (Sounding Reference Signals) request.
10. The wireless communication method of clause 1, wherein the triggering states include a CSI (Channel State Information) request.
11. The wireless communication method of clause 1, wherein the triggering states of the M user devices are jointly coded and indicated by a single value of a data block.
12. The wireless communication method of clause 1, each of the M user devices is configured with one data block.
13. The wireless communication method of clause 1 or 12, wherein a user device is configured with at least one of a position in a DCI payload or information of the number of the triggering states of the user device or other user devices.
14. The wireless communication method of clause 1, 11, or 12, wherein a triggering state of a user device indicated by the network device is determined by at least one of the following: a value of a data block, the number of triggering states of each user device, a mapping order or index of the M user devices, the number of triggering states of previous user devices, a mapping order or index of the previous user devices, a mapping order or index of the user device, or the number of triggering states of the user device.
15. The wireless communication method of clause 1, 11, or 12, wherein a value of a data block is determined by at least one of the following: a triggering state of a user device indicated by the network device, the number of triggering states of each user device, a mapping order or index of the M user devices, the number of triggering states of previous user devices, a mapping order or index of the previous user devices, a mapping order or index of the user device, or the number of triggering states of the user device.
16. The wireless communication method of clause 1, wherein a bit width of each of the N data blocks is associated with at least one of higher layer parameters.
17. The wireless communication method of clause 1, wherein a bit width of each of the N data blocks is associated with a functionality of a data block.

18. The wireless communication method of clause 1, wherein a bit width of each of the N data blocks is associated with a RNTI (Radio Network Temporary Identifier).
19. The wireless communication method of clause 1, wherein a bit width of each of the N data blocks is associated with an ID (identifier) of a user device.
20. A wireless communication method, comprising: receiving, by a user device, from a network device, a control signaling including N data blocks that indicate T triggering states of M user devices, and wherein N, T, and M are natural numbers and the triggering states indicate configuration information of the M user devices.
21. The wireless communication method of clause 20, wherein the triggering states include a wake-up indication.
22. The wireless communication method of clause 20, wherein the triggering states include a go-to-sleep indication.
23. The wireless communication method of clause 20, wherein the triggering states include a PDCCH (Physical Downlink Control Channel) monitoring occasion indication.
24. The wireless communication method of clause 20, wherein the triggering states include a BWP (Bandwidth Part) indicator.
25. The wireless communication method of clause 20, wherein the triggering states include spatial information.
26. The wireless communication method of clause 20, wherein the triggering states include information of time domain resource allocation.
27. The wireless communication method of clause 20, wherein the triggering states include information of QCL (Quasi-co-location) information.
28. The wireless communication method of clause 20, wherein the triggering states include a SRS (Sounding Reference Signals) request.
29. The wireless communication method of clause 20, wherein the triggering states include a CSI (Channel State Information) request.
30. The wireless communication method of clause 20, wherein the triggering states of the M user devices are jointly coded and indicated by a single value of a data block.
31. The wireless communication method of clause 20, each of the M user devices is configured with one data block.
32. The wireless communication method of clause 20 or 31, wherein a user device is configured with at least one of a position in a DCI payload or information of the number of the triggering states of the user device or other user devices.
33. The wireless communication method of clause 20, 30, or 31, wherein a triggering state of a user device indicated by the network device is determined by at least one of the following: a value of a data block, the number of triggering states of each user device, a mapping order or index of the M user devices, the number of triggering states of previous user devices, a mapping order or index of the previous user devices, a mapping order or index of the user device, or the number of triggering states of the user device.
34. The wireless communication method of clause 20, 30, or 31, a value of a data block is determined by at least one of the following: a triggering state of a user device indicated by the network device, the number of triggering states of each user device, a mapping order or index of the M user devices, the number of triggering states of previous user devices, a mapping order or index of the previous user devices, a mapping order or index of the user device, or the number of triggering states of the user device.
35. The wireless communication method of clause 20, wherein a bit width of each of the N data blocks is associated with at least one of higher layer parameters.
36. The wireless communication method of clause 20, wherein a bit width of each of the N data blocks is associated with a functionality of a data block.
37. The wireless communication method of clause 20, wherein a bit width of each of the N data blocks is associated with a RNTI (Radio Network Temporary Identifier).
38. The wireless communication method of clause 20, wherein a bit width of each of the N data blocks is associated with an ID (identifier) of a user device.
39. A communication apparatus comprising a processor configured to implement a method recited in any one or more of clauses 1 to 38.
40. A computer readable medium having code stored thereon, the code, when executed, 8 causing a processor to implement a method recited in any one or more of clauses 1 to 38.

It is intended that the specification, together with the drawings, be considered exemplary only, where exemplary means an example and, unless otherwise stated, does not imply an ideal or a preferred embodiment. As used herein, the use of "or" is intended to include "and/or", unless the context clearly indicates otherwise.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A wireless communication method, comprising:
transmitting, by a network device, to one or more user devices, a control signaling including N data blocks that indicate T triggering states of M user devices, and
wherein N, T, and M are natural numbers and the triggering states indicate corresponding configuration information of the M user devices, and
wherein the triggering states include at least one of a wake-up indication, a go-to-sleep indication, or a BWP (Bandwidth Part) indicator, and
wherein the control signaling is included in a first set of DCI (Downlink Control Information) formats or candidates with CRC (Cyclic Redundancy Check) scrambled by PS-RNTI (Power Saving Radio Network Temporary Identifier).

2. The wireless communication method of claim 1, wherein each of the M user devices is configured with one data block and wherein the configuration information further includes at least one of spatial information, information of time domain resource allocation, information of QCL (Quasi-co-location) information, a SRS (Sounding Reference Signals) request, or a CSI (Channel State Information) request.

3. The wireless communication method of claim 1, wherein the user device is configured with at least one of a position in a DCI payload or information of the number of the triggering states of the user device or other user devices.

4. The wireless communication method of claim 1, wherein the triggering state of the user device indicated by the network device is determined further based on at least one of the following: a value of a data block, the number of triggering states of each user device, a mapping order or index of the M user devices, the number of triggering states of previous user devices, a mapping order or index of the previous user devices, or the number of triggering states of the user device.

5. The wireless communication method of claim 1, wherein a value of the data block is determined further based on at least one of the following: a triggering state of a user device indicated by the network device, the number of triggering states of each user device, a mapping order or index of the M user devices, the number of triggering states of previous user devices, a mapping order or index of the previous user devices, or the number of triggering states of the user device.

6. The wireless communication method of claim 1, wherein a monitoring occasion of a first set of PDCCH candidates is different from a monitoring occasion of a second set of PDCCH candidates in time domain.

7. The wireless communication method of claim 1, wherein the first set of DCI formats or candidates is different from a second set of DCI formats or candidates that includes at least one of DCI format 0-0, DCI format 0-1, DCI format 1-0, DCI format 1-1, DCI format 2-0, DCI format 2-1, DCI format 2-2, or DCI format 2-3, or wherein the second set of DCI formats or candidates is a DCI with CRC scrambled by at least one of the following: C-RNTI, CS-RNTI, MCS-C-RNTI, TC-RNTI, SP-CSI-RNTI, P-RNTI, SI-RNTI, RA-RNTI, TC-RNTI, SFI-RNTI, INT-RNTI, TPC-PUSCH-RNTI, or TPC-PUCCH-RNTI.

8. A wireless communication method, comprising:
receiving, by a user device, from a network device, a control signaling including N data blocks that indicate T triggering states of M user devices, and
wherein N, T, and M are natural numbers and the triggering states indicate corresponding configuration information of the M user devices, and
wherein the triggering states include at least one of a wake-up indication, a go-to-sleep indication, or a BWP (Bandwidth Part) indicator, and
wherein the control signaling is included in a first set of DCI (Downlink Control Information) formats or candidates with CRC (Cyclic Redundancy Check) scrambled by PS-RNTI (Power Saving Radio Network Temporary Identifier).

9. The wireless communication method of claim 8, wherein each of the M user devices is configured with one data block and wherein the configuration information further includes at least one of spatial information, information of time domain resource allocation, information of QCL (Quasi-co-location) information, a SRS (Sounding Reference Signals) request, or a CSI (Channel State Information) request.

10. The wireless communication method of claim 8, wherein the user device is configured with at least one of a position in a DCI payload or information of the number of the T triggering states of the user device or other user devices.

11. The wireless communication method of claim 8, wherein the triggering state of the user device indicated by the network device is determined further based on at least one of the following: a value of a data block, the number of triggering states of each user device, a mapping order or index of the M user devices, the number of triggering states of previous user devices, a mapping order or index of the previous user devices, or the number of triggering states of the user device.

12. The wireless communication method of claim 8, wherein a value of the data block is determined further based on at least one of the following: a triggering state of the user device indicated by the network device, the number of triggering states of each user device, a mapping order or index of the M user devices, the number of triggering states of previous user devices, a mapping order or index of the previous user devices, or the number of triggering states of the user device.

13. The wireless communication method of claim 8, wherein a monitoring occasion of a first set of PDCCH candidates is different from a monitoring occasion of a second set of PDCCH candidates in time domain.

14. The wireless communication method of claim 8, wherein the first set of DCI formats or candidates is different from a second set of DCI formats or candidates that includes at least one of DCI format 0-0, DCI format 0-1, DCI format 1-0, DCI format 1-1, DCI format 2-0, DCI format 2-1, DCI format 2-2, or DCI format 2-3, or wherein the second set of DCI formats or candidates is a DCI with CRC scrambled by at least one of the following: C-RNTI, CS-RNTI, MCS-C-RNTI, TC-RNTI, SP-CSI-RNTI, P-RNTI, SI-RNTI, RA-RNTI, TC-RNTI, SFI-RNTI, INT-RNTI, TPC-PUSCH-RNTI, TPC-PUCCH-RNTI.

15. A communication apparatus comprising a processor and a memory, wherein the processor is configured to:
   transmit, to one or more user devices, a control signaling including N data blocks that indicate T triggering states of M user devices, and
   wherein N, T, and M are natural numbers and the triggering states indicate corresponding configuration information of the M user devices, and
   wherein the triggering states include at least one of a wake-up indication, a go-to-sleep indication, or a BWP (Bandwidth Part) indicator, and
   wherein the control signaling is included in a first set of DCI (Downlink Control Information) formats or candidates with CRC (Cyclic Redundancy Check) scrambled by PS-RNTI (Power Saving Radio Network Temporary Identifier).

16. The communication apparatus of claim 15, wherein the user device is configured with at least one of a position in a DCI payload or information of the number of the triggering states of the user device or other user devices.

17. The communication apparatus of claim 15, wherein the triggering state of the user device indicated by the communication apparatus is determined further based on at least one of the following: a value of a data block, the number of triggering states of each user device, a mapping order or index of the M user devices, the number of triggering states of previous user devices, a mapping order or index of the previous user devices, or the number of triggering states of the user device.

18. The communication apparatus of claim 15, wherein a value of the data block is determined further based on at least one of the following: a triggering state of a user device indicated by the communication apparatus, the number of triggering states of each user device, a mapping order or index of the M user devices, the number of triggering states of previous user devices, a mapping order or index of the previous user devices, or the number of triggering states of the user device.

19. The communication apparatus of claim 15, wherein a monitoring occasion of a first set of PDCCH candidates is different from a monitoring occasion of a second set of PDCCH candidates in time domain.

20. The communication apparatus of claim 15, wherein the first set of DCI formats or candidates is different from a second set of DCI formats or candidates that includes at least one of DCI format 0-0, DCI format 0-1, DCI format 1-0, DCI format 1-1, DCI format 2-0, DCI format 2-1, DCI format 2-2, or DCI format 2-3, or wherein the second set of DCI formats or candidates is a DCI with CRC scrambled by at least one of the following: C-RNTI, CS-RNTI, MCS-C-RNTI, TC-RNTI, SP-CSI-RNTI, P-RNTI, SI-RNTI, RA-RNTI, TC-RNTI, SFI-RNTI, INT-RNTI, TPC-PUSCH-RNTI, or TPC-PUCCH-RNTI.

* * * * *